United States Patent [19]

Nakadozono et al.

[11] Patent Number: 5,075,669

[45] Date of Patent: Dec. 24, 1991

[54] WARNING SYSTEM FOR DETECTING BURNED-OUT CONDITION OF AUTOMOTIVE LAMPS

[75] Inventors: Hiroshi Nakadozono; Shigetoshi Daidoji, both of Kanagawa, Japan

[73] Assignee: Nissan Motor Company, Limited, Japan

[21] Appl. No.: 450,976

[22] Filed: Dec. 15, 1989

[30] Foreign Application Priority Data

Dec. 29, 1988 [JP] Japan .................. 63-331746

[51] Int. Cl.⁵ .............................................. B60Q 11/00
[52] U.S. Cl. .................................... 340/458; 340/642
[58] Field of Search ............... 340/458, 641, 642, 459; 364/424.03, 424.04

[56] References Cited

U.S. PATENT DOCUMENTS 3,593,264  7/1971  Atkins ........................ 340/642 X
3,706,983  12/1972  Olson et al. ................. 340/642 X
4,667,187  5/1987  Volk et al. ........................ 340/641
4,728,861  3/1988  Kurihara et al. ............ 340/458 X
4,745,339  5/1988  Izawa et al. ................. 340/642 X
4,903,011  2/1990  Reinholm et al. ........... 340/458 X Primary Examiner—Jin F. Ng
Assistant Examiner—B. Tumm
Attorney, Agent, or Firm—Lowe, Price, LeBlanc & Becker

[57] ABSTRACT

A warning system for burned-out condition of automotive lamps including brake lamps, high-mount lamps and tail lamps, includes a detection circuit for monitoring the lamps to produce a first signal indicative of the presence of a burned-out lamp, and for monitoring a brake-lamp switch and a light switch to produce a second signal when the brake-lamp switch is ON and a third signal when the light switch is ON. The warning system also includes a control unit which receives the first, second and third signals and determines the identity of the lamp group including at least one burned-out lamp, and an indicator which indicates the identity of the lamp group including at least one burned-out lamp on the basis of the determination by the control unit.

3 Claims, 2 Drawing Sheets

WARNING SYSTEM FOR DETECTING BURNED-OUT CONDITION OF AUTOMOTIVE LAMPS

BACKGROUND OF THE INVENTION

1. Field of the Invention

The present invention relates generally to a warning system for detecting burned-out condition of automotive lamps. More specifically, the invention relates to a warning system for detecting burned-out condition of a plurality of lamps such as brake lamps, high-mount lamps and tail lamps mounted on an automotive vehicle and for indicating such a burned-out condition.

2. Description of the Prior Art

Such a warning system has been disclosed in the Japanese Utility Model First (unexamined) Publication (Jikkai Sho.) No. 56-84440. This system has a detection circuit for detecting whether or not at least one lamp is burned out among a plurality of automotive lamps, such as brake lamps, high-mount lamps and tail lamps. The detection circuit has three sensors which respectively detect burned-out condition of the brake lamps, the high-mount lamps and the tail lamps, and cause a transistor to be turned on when at least one of the lamps is burned out. This system also has a warning lamp which is tuned on in response to the turning ON of the transistor, so that a vehicle's driver or a repairman can recognize that at least one of the lamps is burned-out. However, according to this system, the driver or repairman can not recognize in which group of lamps the burned-out lamp is present among the brake lamp, the high-mount lamp and the tail lamp groups. Since the warning lamp is turned on when at least one of lamps is burned out, it is troublesome and time consuming to exchange the burned-out lamp for a new lamp in this system.

SUMMARY OF THE INVENTION

It is therefore a principal object of the present invention to eliminate the aforementioned disadvantage and to provide a warning system which determines and indicates which group of automotive lamps has a burned-out lamp, so that a vehicle's driver or a repairman can easily exchange the burned-out lamp for a new lamp.

In order to accomplish the aforementioned and other specific objects, a warning system for burned-out automotive lamps includes: means for detecting the switching conditions of first and second switch means for first and second lamp groups and for detecting whether or not the first and second lamp groups has burned-out lamp, so as to determine which group has a burned-out lamp.

According to one aspect of the present invention, a warning system for burned-out condition of first and second automotive groups, comprises:

first switch means for allowing the first lamp group to be turned on;
second switch means for allowing the second lamp group to be turned on;
detecting means for monitoring the first and second lamp groups to produce a first signal when at least one lamp of the first and second lamp groups is burned out, and for monitoring the first and second switch means to produce a second signal; when the first switch means is ON and a third signal when the second switch means is ON;
discriminating means for receiving the first second and third signals to determine the identity of the lamp group including at least one burned-out lamp, on the basis of the first, second and third signals to produce a fourth signal indicative of the lamp group including at least one burned-out lamp and
indicator means for receiving the fourth signal to the identity of the lamp group including at least one burned-out lamp.

After the indicator means indicates the identity of the lamp group including at least one burned-out lamp, the discriminating means may further determine that the burned-out lamp has been replaced if the discriminating means does not subsequently receive the first signal in the same switching conditions of the first and second switch means as at the detection time of the burned-out lamp. In this case, the discriminating means may cause the indicator means to erase the previous indication. The burned-out warning system may further comprise memory means for storing information about the determinations of the discriminating means when any one of the first and second lamp groups has at least one burned-out lamp, even if the vehicle's ignition switch becomes OFF. In this case, the indicator means will indicate the identity of the lamp group including at least one burned-out lamp when the ignition switch becomes ON in cases where such information is stored in the memory means.

DESCRIPTION OF THE PREFERRED EMBODIMENT

Figure 1:
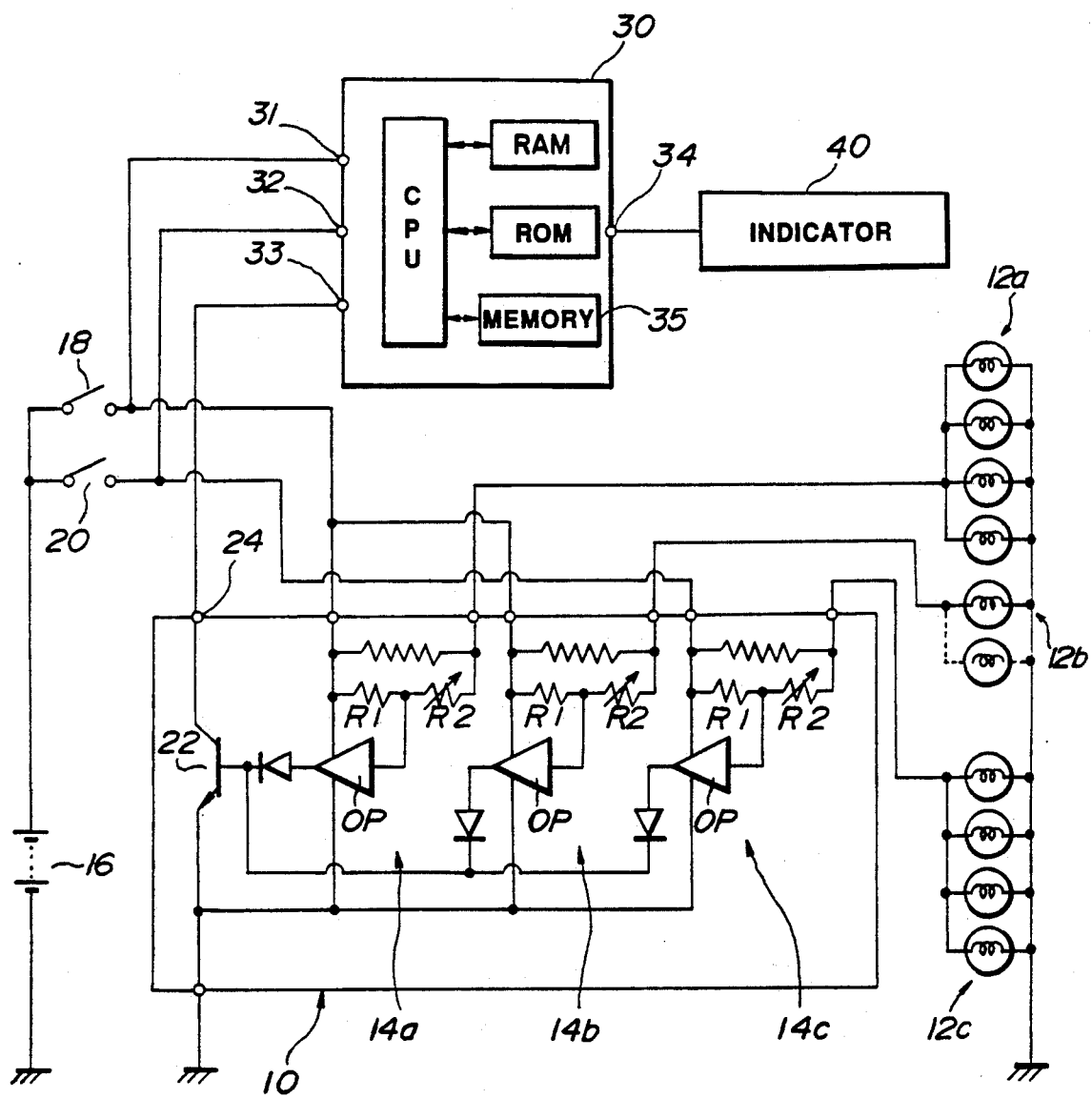
FIG. 1 is a circuit diagram of the preferred embodiment of warning system for detecting a burned-out condition of automotive lamps according to the present invention.

Referring now to the drawings, particularly to FIG. 1, a warning system for detecting burned-out condition of automotive lamps includes detection circuit 10 which detects a burned-out condition of automotive lamps including brake lamps 12a, high-mount lamps 12b and tail lamps 12c. The detection circuit 10 includes sensors 14a, 14b and 14c which monitor burned-out condition of the brake lamps 12a, the high-mount lamps 12b and the tail lamps 12c, respectively. Each of the sensors 14a, 14b and 14c has an operational amplifier OP, a resistor R1 and a variable resistor R2. The sensors 14a and 14b are supplied with electrical power from a power source 16 when a brake-lamp switch 18 is turned on, and the sensor 14c is supplied with electrical power from the latter when a light switch 20 is turned on. In a case where any one of the brake lamps 12a, the high-mount lamps 12b or the tail lamps 12c is burned out, voltage input to the corresponding operational amplifier OP is designed to exceed a predetermined value so that the corresponding sensor 14a, 14b or 14c produces a high-level detection signal. The high-level detection signal is supplied to base electrode of a transistor 22, so that the transistor 22 becomes on.

For example, when the light switch 20 becomes ON, electrical power is supplied to the sensor 14c and the tail lamps 12c, so that the tail lamps 12 are turned on, and the sensor 14c monitors burned-out condition of the tail lamps 12c. The input battery voltage is divided in accordance with the voltage ratio of the resistances of the resistors R1 and R2 and the resistances of the combined filaments of the tail lamps 12c. The sensor 14c compares the divided voltage with a predetermined value and produces a high-level detection signal when the divided voltage becomes greater than the predetermined value. Therefore, when all of the tail lamps 12c are normal, i.e. not burned out, voltage applied to a monitor line Lm of the sensor 14c is less than the predetermined value, and the signal output from the output line Lo of the sensor 14c is low level. When any one of bulbs of the tail lamps 12c is burned out, the resistance of the tail lamps 12c becomes greater than an initial value so that the divided voltage ratio changes. Therefore, voltage applied to the monitor line Lm becomes greater than the predetermined value, and the high-level signal is output to the output line Lo. As a result, the transistor 22 becomes ON, so that a low-level signal indicative of the presence of a burned-out lamp among the tail lamps 12c is supplied to an output terminal 24. Similar operations are applied with respect to the brake lamps 12a and high-mount lamps 12b.

According to the present invention, the warning system also includes a control unit 30 serving as a discriminating means, which comprises a CPU, RAM, ROM and so forth. Three input terminals 31, 32 and 33 of the control unit 30 are connected to the brake lamp switch 18 serving as first switch means, the light switch 20 serving as second switch means, and the output terminal 24 of the detection circuit 10, respectively. As seen in the flowchart shown in FIG. 2, the control unit 30 determines which switch is turned ON, on the basis of the signal states input to the terminals 31, and 32 and, whether or not at least one lamps is burned out on the basis of the signal state input to the terminal 33, so as to determine which group of lamps has a burned-out lamp among the brake lamp, the high-mount lamp and the tail lamp groups. An output terminal 34 of the control unit 30 is connected to an indicator 40 serving as an indicator means. The indicator 40 indicates the identity of the lamp group including at least one burned-out lamp, and whether or not the detecting circuit 10 malfunctions or fails to function properly, on the basis of results determined by the control unit 30. The control unit 30 also includes a battery type back-up memory 35 which stores the content of a flag F on the basis of information about the identity of a lamp group including at least one burned-out lamp, which will be described hereinafter. Furthermore, the brake lamps 12a and the high-mount lamps 12b serve as a first lamp group, and the tail lamps 12c serves as a second lamp group. As will be described hereinafter, according to the invention, the identity of a lamp group including at least one burned-out lamp among the first and second lamp groups may be determined.

Figure 2:
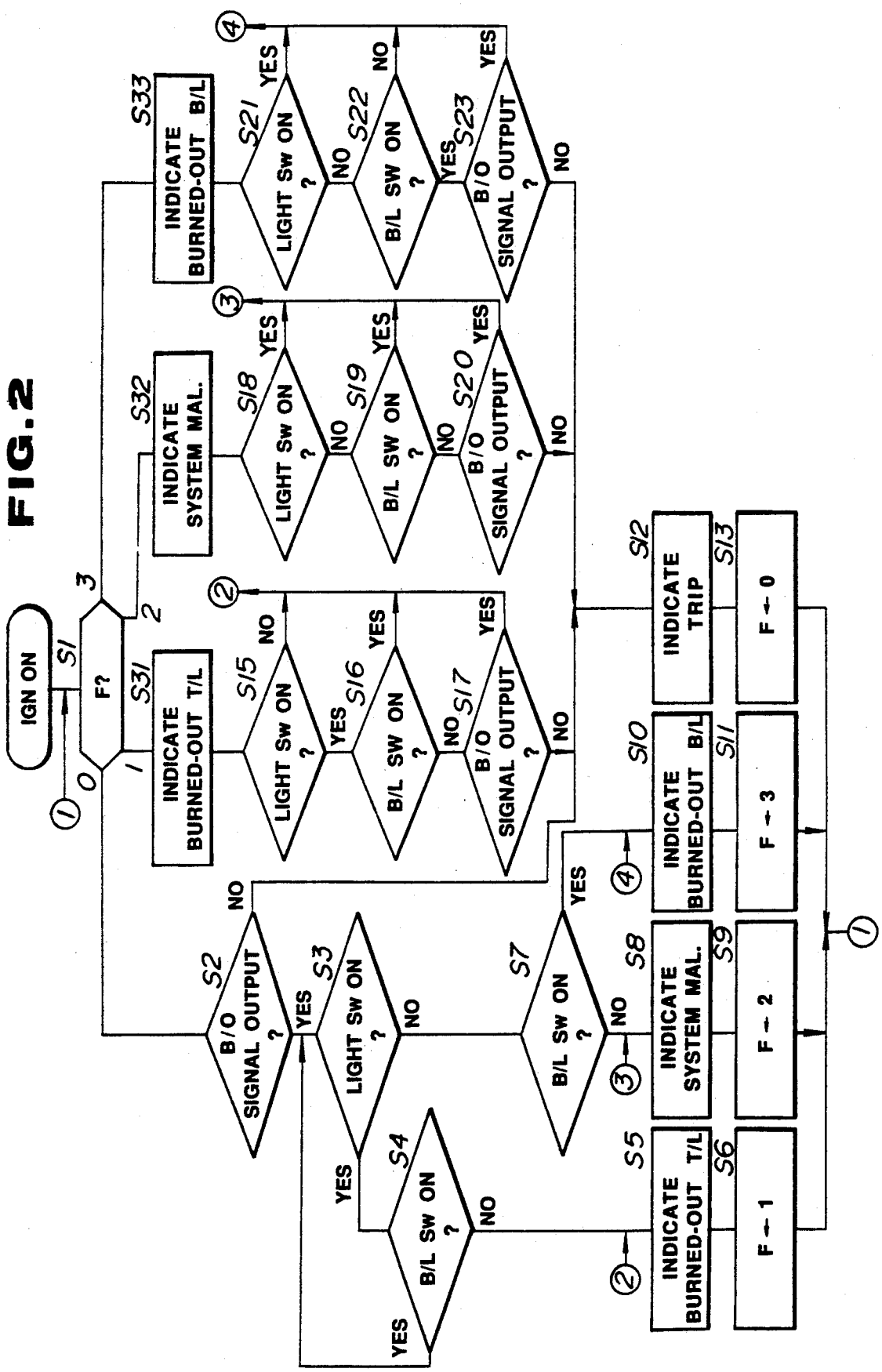
FIG. 2 is a flow chart of a program for determining and indicating the identity of a lamp group including at least one burned-out lamp by the warning system of FIG. 1.

FIG. 2 shows a flowchart for the discrimination program of the preferred embodiment according to the present invention. When an ignition switch (not shown) becomes ON, the program is immediately executed. First, at step 1, the value of a flag F is determined as being 0, 1, 2 and 3. When the value is 0, the routine goes to step 2. At step 2, it is determined whether or not a signal is being output from the detection circuit 10 by determining whether or not the input terminal 33 is low level. In this specification, the aforementioned signal, i.e. the low-level detection signal output from the output terminal 24 of the detection circuit 10 will be referred to as a "burned-out lamp signal". When it is low level, the routine goes to step 3 in which it is determined whether or not the light switch 20 is ON. When it is ON, the routine goes to step 4 in which it is determined whether or not the brake-lamp switch 18 is ON. When it is ON, the routine returns step 3, and when it is not ON the routine goes to step 5. At step 5, it is determined that at least one of the tail lamps 12c is burned out, so that the indicator 40 indicates some. This indication will be referred to as "burned-out tail-lamp indication". Thereafter, the value of the flag F is reset to 1 at step 6, and the routine returns step 1.

When it is determined that the light switch 20 is not ON at step 3, the routine goes to step 7 at which it is determined whether or not the brake lamp switch 18 is ON. If the brake lamp switch 18 is not ON, the routine goes to step 8 at which it is determined that the system is malfunctioning, so that the indicator 40 indicates that a system malfunction. This indication will be referred to as "system malfunction indication". Thereafter, the value of the flag F is set at 2 in step 9, and the routine returns to step 1.

When it is determined that the brake lamp switch 18 is ON at step 7, the routine goes to step 10 in which it is determined that at least one of the brake lamps 12a is burned out, so that the indicator 40 indicates some. This indication will be referred to as a "burned-out brake-lamp indication". Thereafter, the value of the flag F is set to be 3 at step 11, and the routine returns step 1.

At step 2, if no burned-out lamp signal is output from the detection circuit 10, i.e. the input terminal 33 is inputting high-level signal, the routine goes to step 12 for causing the indicator 40 to indicate that the tail lamps, brake lamps and the system are normal or not burned out. This indication will be referred to as a "trip indication". Thereafter, the value of the flag F is set to be 0 at step 13, and the routine returns step 1.

On the other hand, at step 1, when it is determined that the value of the flag F is 1, i.e. at least one of the tail lamps 12c is burned out, the routine goes to step 31 for causing the indicator 40 to indicate the tail-lamp burned-out indication, and then the routine goes to step 15. Only when the ignition switch is ON, the value of the flag F (1, 2 or 3) is determined.

At step 15, it is determined whether or not the light switch 20 is On. When it is ON, the routine goes to step 16 in which it is determined whether or not the brake lamp switch 18 is ON. When it is not ON, at step 17, it is determined whether or not the burned-out lamp signal is output from the detection circuit 10 on the basis of signal state of the input terminal 33. When it is high-level, it is determined that the burned-out tail lamp 12c has been replaced, and the routine goes to step 12. At step 12, the previous indication, i.e. the burned-out tail-lamp indication is deleted, and then the trip indication is indicated. Thereafter, the value of the flag F is set at 0 in step 13. When it is determined that the light switch 20 is not ON at step 15, the brake lamp switch 18 is ON at step 16, or the burned-out lamp signal is output from the detection circuit 10 at step 17, the routine goes to step 5 for causing the indicator 40 to indicate the burned-out tail-lamp indication.

At step 1, when it is determined that the value of the flag F is 2, i.e. the system is malfunctioning, the routine goes to step 32 in which the indicator 40 indicates the system malfunction, and then the routine goes to step 18 in which it is determined whether or not the light switch 20 is ON. When it is not ON, the routine goes to step 19 in which it is determined whether or not the brake lamp switch 18 is ON. At step 19, when it is determined that it is not ON, it is determined whether or not the burned-out lamp signal is being output from the detection circuit 10 at step 20. When it is not output, it is determined that the abnormality or malfunction in the system has been repaired, and the routine goes to step 12 in which the indicator 40 is caused to delete the previous system malfunction indication and then indicate the trip indication. Thereafter, the value of the flag F is set to be 0 at step 13, and then the routine returns step 1. When it is determined that the light switch 20 is not ON at step 18, the brake lamp switch 18 is not ON at step 19, or the burned-out lamp signal is output from the detection circuit 10, the routine goes to step 8 for causing the indicator 40 to remain indicating the system malfunction indication.

Furthermore, at step 1, when it is determined that the value of the flag F is 3, i.e. at least one lamp among the brake lamps 12a and the high-mount lamps 12b is burned out, the routine goes to step 33 in which the indicator 40 is caused to indicate the burned-out brake-lamp indication, and then the routine goes to step 21 in which it is determined whether or not the light switch 20 is ON. When it is not ON, the routine goes to step 22 in which it is determined whether or not the brake lamp switch 18 is ON. When it is ON, the routine goes to step 23 in which it is determined whether or not the burned-out lamp signal is being output from the detection circuit 10. When it is not output, it is determined that the burned-out brake or high-mount lamp has been replaced, and the routine goes to step 12 in which the indicator 40 is caused to delete the previous burned-out brake-lamp indication and then indicate the trip indication. Thereafter, the value of the flag F is set to 0 at step 13, and then the routine returns step 1. When it is determined that the light switch 20 is ON at step 21, the brake lamp switch 18 is not ON at step 22, or the lamp burned-out signal is output from the detection circuit 10, the routine goes to step 10 for causing the indicator 40 to remain indicating the burned-out brake-lamp indication.

According to the aforementioned process, when only the light switch 20 is ON and the burned-out lamp signal is output from the detection circuit 10, the indicator 40 indicates that at least one of the tail lamps 12c is burned out. In addition, when only the brake lamp switch 18 is ON and the burned-out lamp signal is output from the detection circuit 10, the indicator 40 indicates that at least one lamp among the brake lamps 12a and the high-mount lamps 12b is burned out. Furthermore, when the burned-out lamp signal is output from the detection circuit 10 is spite of indicating that both of the brake lamp switch 18 and the light switch 20 are not ON, the indicator 40 indicates the system malfunction indication. Therefore, the burned-out warning system, according to the present invention, may be determine and indicate which group of lamps has a burned-out lamp which should be exchanged for a new lamp.

When the ignition switch is turned on after a burned-out lamp is exchanged for a new lamp according to the aforementioned indication, the discriminating program is executed again. In this case, the previous content of the flag F is memorized in the battery type back-up memory 35. Therefore, according to the content stored in the memory 35 when the ignition switch becomes ON, the control unit 30 causes the indicator 40 to indicate the trip indication if the value of the flag is 0, the burned-out tail-lamp indication if it is 1, the system malfunction indication if it is 2, and the burned-out brake-lamp indication if it is 3. Accordingly, in a case where the ignition switch is turned off after the burned-out condition is detected, the indicator 40 will indicate the identity of the burned-out group just by turning the ignition switch on, without the need of executing the discriminating program again. This aids a vehicle's driver or a repairman to positively identify the burned-out lamp group which should be exchanged. Thereafter, when the brake lamp switch 18 or the light switch 20 is turned on, the detection circuit 10 performs burned-out detection. In this case, if the burned-out lamp signal is not detected, the control unit 30 causes the indicator 40 to delete the burned-out tail-lamp indication or the burned-out brake-lamp indication, and to display the trip indication which indicates all clear, or that the burned-out lamp has been replaced. If the system is abnormal or malfunctions, a similar procedure is carried out. That is, when the ignition switch, the brake lamp switch 18 and the light switch 20 are turned on after abnormality or malfunctioning of the system is dissolved, the control unit 30 causes the indicator 40 to erase the system malfunction indication and to display the trip indication.

As mentioned above, according to the preferred embodiment of the present invention, only when the burned-out lamp signal is not output in the same switching condition as that in determining whether or not any one of the lamp group has a burned-out lamp, the burned-out lamp indication is erased. The reason why the burned-out lamp indication is erased in such a switching condition is as follows.

The burned-out detection is carried out by only when the brake lamp switch 18 and/or the light means of the detection circuit 10 switch 20 is ON for applying voltage to the detection circuit 10. Therefore, when the brake lamp switch 18 and/or the light switch 20 becomes OFF, the burned-out lamp signal is deleted, so that the control unit 30 determines that the burned-out lamp is recovered and causes to the indicator 40 to delete the burned-out lamp indication. That is, the burned-out lamp indication is displayed in the indicator 40 when the brake lamp switch 18 or the light switch 20 is ON, and is prevented from being erased when the latter is OFF, so that it is possible for a vehicle's driver or a repairman to certainly recognize the identity of the burned-out lamp.

While the present invention has been disclosed with respect to vehicles having high-mount brake lamps 12b, it should be appreciated that the invention can be embodied in a vehicle without high-mount brake lamps 12b. In addition, while the present invention has been disclosed with respect to the detection circuit 10 to which electrical power is applied via the brake lamp switch 18 and the light switch 20 from the battery, it should be appreciated that the invention can be embodied with a detection circuit to which electrical power is applied from a battery other than that used for detecting whether or not the switch 18 or 20 is ON.

What is claimed is:

1. A warning system for burned-out condition of first and second automotive lamp groups, each of which has at least one lamp, said system comprising:
   first switch means for allowing said first lamp group to be turned on;
   second switch means for allowing said second lamp group to be turned on;

detecting means for monitoring said first and second lamp groups to produce a first signal when said at least one lamp of said first or second lamp groups is burned out, and for monitoring said first and second switch means to produce a second signal when said first switch means is ON and a third signal when said second switch means is ON;

discriminating means for receiving said first, second and third signals to determine the identity of a burned-out lamp group having at least one burned-out lamp on the basis of said first, second and third signals, to produce a fourth signal indicative of said burned-out lamp group; and indicator means for receiving said fourth signal to indicate the identity of said burned-out lamp group.

2. A system as set forth in claim 1, wherein after said indicator means indicates the identity of said burned-out lamp group, said discriminating means determines that the burned-out lamp has been replaced when the discriminating means does not receive said first signal under the same switching conditions of said first and second switch means as at a detection time of the burned-out lamp, and wherein said discriminating means causes said indicator means to erase the previous indication.

3. A system as set forth in claim 1, which further comprises memory means for storing information about the determination by said discriminating means when any one of said first and second lamp groups has said at lease one burned-out lamp, even if an ignition switch becomes OFF, and wherein said indicator means indicates the identity of said burned-out lamp group when said ignition switch becomes ON in cases where said information is stored in said memory means.

* * * * *